US011732744B2

(12) United States Patent
Osborne et al.

(10) Patent No.: US 11,732,744 B2
(45) Date of Patent: Aug. 22, 2023

(54) STRAIGHT SHANK END SCREW FOR FOREIGN-OBJECT-DEBRIS (FOD) REDUCTION

(71) Applicant: THE BOEING COMPANY, Chicago, IL (US)

(72) Inventors: John C. Osborne, Bothell, WA (US); Terrence C. Seet, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 86 days.

(21) Appl. No.: 16/274,836

(22) Filed: Feb. 13, 2019

(65) Prior Publication Data
US 2020/0256375 A1    Aug. 13, 2020

(51) Int. Cl.
| F16B 25/00 | (2006.01) |
| F16B 39/284 | (2006.01) |
| F16B 5/02 | (2006.01) |
| B64F 5/10 | (2017.01) |

(52) U.S. Cl.
CPC .......... F16B 39/284 (2013.01); F16B 5/0258 (2013.01); *B64F 5/10* (2017.01)

(58) Field of Classification Search
CPC ...... F16B 5/0258; F16B 39/284; F16B 39/36; F16B 13/124; F16B 13/0833; F16B 13/12
USPC ......... 411/80.6, 55, 386, 411, 424, 173, 174
See application file for complete search history.

(56) References Cited

U.S. PATENT DOCUMENTS

| 3,724,315 A * | 4/1973 | Sygnator | F16B 25/0021 411/386 |
| 4,671,718 A * | 6/1987 | Eakin | B21J 15/42 81/177.85 |
| 4,732,519 A * | 3/1988 | Wagner | F16B 5/0258 403/14 |
| 4,760,495 A * | 7/1988 | Till | F16B 5/0233 174/138 D |
| 4,834,600 A * | 5/1989 | Lemke | F16B 13/12 411/908 |

(Continued)

FOREIGN PATENT DOCUMENTS

| CN | 102458284 A | 5/2012 |
| CN | 111561501 A | 8/2020 |

(Continued)

OTHER PUBLICATIONS

EP Communication Pursuant to Rule 62 EPC for EP Application No. 19217928.1 dated Jun. 8, 2020.

(Continued)

*Primary Examiner* — Gary W Estremsky
(74) *Attorney, Agent, or Firm* — Quinn IP Law

(57) ABSTRACT

A fastener which includes a first portion of a shaft which defines threads, and a second portion of the shaft, which extends from the first portion of the shaft, includes a planar curved surface. A method for securing a fastener to an e-nut, which includes the step of inserting the fastener positioned within an e-nut into an opening defined by and which extends through at least two components to be secured together, wherein: a first portion of the shaft of the fastener defines threads; and a second portion of the shaft of the fastener, which extends from the first portion of the shaft, defines a curved planar surface.

21 Claims, 7 Drawing Sheets

(56) References Cited

U.S. PATENT DOCUMENTS

| | | | | |
|---|---|---|---|---|
| 4,890,964 | A * | 1/1990 | Lindley | F16B 39/36 411/270 |
| 5,065,490 | A * | 11/1991 | Wivagg | G21C 11/08 29/402.09 |
| 5,073,073 | A * | 12/1991 | Kazino | F16B 35/047 411/386 |
| 5,094,579 | A * | 3/1992 | Johnson | F16B 35/041 411/970 |
| 5,205,692 | A * | 4/1993 | Kelbert | F16B 5/0216 411/338 |
| 5,306,091 | A * | 4/1994 | Zaydel | F16B 37/041 411/386 |
| 5,803,689 | A * | 9/1998 | Magnus | E21B 41/0007 411/21 |
| 5,993,129 | A * | 11/1999 | Sato | F16B 13/124 411/43 |
| 6,044,670 | A * | 4/2000 | Citurs | A01C 23/008 215/360 |
| 6,280,132 | B1 * | 8/2001 | Szczukowski | F16B 5/0258 411/107 |
| 7,993,085 | B2 * | 8/2011 | McClure | F16B 37/043 411/55 |
| 8,388,289 | B2 * | 3/2013 | Mazur | F16B 37/043 411/173 |
| 9,303,674 | B2 * | 4/2016 | Demmeler | F16B 21/18 |
| 9,562,554 | B2 * | 2/2017 | Vidal | F16B 13/08 |
| 10,378,571 | B2 * | 8/2019 | McClure | F16B 13/0833 |
| 10,465,734 | B2 * | 11/2019 | McClure | F16B 19/1081 |
| 10,589,835 | B2 * | 3/2020 | Mills | F16B 19/1081 |
| 10,717,515 | B2 * | 7/2020 | Mills | B64C 1/18 |
| 2005/0169726 | A1 * | 8/2005 | McClure | F16B 37/043 411/55 |
| 2011/0008124 | A1 * | 1/2011 | Niklewicz | F16B 13/0833 411/80.6 |
| 2013/0142590 | A1 * | 6/2013 | Frank | F16B 15/00 411/386 |
| 2014/0056668 | A1 | 2/2014 | Demmeler | |
| 2016/0208839 | A1 * | 7/2016 | Vidal | F16B 37/02 |
| 2017/0248163 | A1 | 8/2017 | McClure | |
| 2018/0094667 | A1 * | 4/2018 | Clark | F16B 21/06 |
| 2018/0111573 | A1 * | 4/2018 | Arguello Gleason | F16B 5/0258 |
| 2019/0078600 | A1 * | 3/2019 | McClure | F16B 5/0258 |
| 2019/0242418 | A1 * | 8/2019 | Clark | F16B 5/0258 |

FOREIGN PATENT DOCUMENTS

| | | |
|---|---|---|
| EP | 2247862 | 11/2010 |
| EP | 3456989 A1 | 3/2019 |
| WO | WO-03069971 A2 | 8/2003 |
| WO | WO-2017161336 A1 | 9/2017 |

OTHER PUBLICATIONS

EP Search Report for EP Application No. 19217928 dated May 28, 2020.

Communication Pursuant to Article 94(3) EPC for EP Application No. 19217928.1 dated Sep. 1, 2022.

* cited by examiner

INSERTING THE FASTENER POSITIONED WITHIN AN E-NUT INTO AN OPENING DEFINED BY AND WHICH EXTENDS THROUGH AT LEAST TWO COMPONENTS TO BE SECURED TOGETHER, WHEREIN: A FIRST PORTION OF THE SHAFT OF THE FASTENER DEFINES THREADS; AND A SECOND PORTION OF THE SHAFT OF THE FASTENER, WHICH EXTENDS FROM THE FIRST PORTION OF THE SHAFT, DEFINES A CURVED PLANAR SURFACE.

STRAIGHT SHANK END SCREW FOR FOREIGN-OBJECT-DEBRIS (FOD) REDUCTION

FIELD

This disclosure relates to a fastener for connecting two or more parts together and more particularly to a threaded fastener which secures to an e-nut.

BACKGROUND

In fabricating structures such as an aircraft, fastening two or more parts together is usually accomplished with a fastener assembly. Fastening parts such as a floor panel to a seat track, floor panel intercostals to a seat track and seat furniture fittings to floor panels include use of fastener assemblies which, for example, include an e-nut and a threaded fastener. The threaded fastener is inserted into the e-nut and compatible threads of the e-nut and the threaded fastener engage one another. The threaded fastener and e-nut are pushed into an opening, which extends through two or more components to be fastened together until a portion of the e-nut carrying securement flanges extend beyond the opening and extend in a direction away from a central axis of the threaded fastener. Turning of the threaded fastener enables the threaded fastener to travel through the threaded portion of the e-nut with the threaded fastener engaging and abutting collapsed legs or tines of the e-nut.

As the threaded fastener continues to be turned, threaded fastener progresses along and through the e-nut, with the threads of the threaded fastener pushing against the collapsed legs or tines of the e-nut such that the collapsed tines move away from a central axis of the threaded fastener. However, in this process the threaded portion of the threaded fastener engages sharp edges of the tines being moved. Further turning of the threaded fastener to a position of seating the head of the threaded fastener and accessing a specified torque the sharp edges includes the sharp edges of the tines of the e-nut cutting into the threads of the threaded fastener as the threaded fastener is turned and as the tines are moved away from a central axis of the threaded fastener. With the threaded fastener attaining a fastened position at a specified torque, the securement flanges of the tines abut a surface of one of the at least two components being fastened together applying a compressive force to the two or more components between a head of the threaded fastener and the securement flanges of the tines positioned beyond the opening in the at least two components being secured together. In the fastening process, metallic filings are generated from the threads of the threaded fastener by way of the sharp edges of the tines of the e-nut cutting the threads of the threaded fastener during the fastening process. These filings are distributed in the locale of the threaded fastener and the e-nut and is referred to as foreign-object-debris ("FOD").

The generation of sufficient filings or FOD results in the need to conduct air worthiness inspections with respect to an aircraft under Federal Aviation Association regulations. The air worthiness inspections incur time during the fabrication of the aircraft and result in additional cost. Additionally the FOD is removed from the aircraft which also incurs additional time and cost in the fabrication process. Moreover, the FOD can be distributed in the fastening process such that the filings are positioned between surfaces of the threads of the fastener and threads of the e-nut, which can result in providing a higher torque reading of securement when tested than the actual torque securement of the threaded fastener with the e-nut.

Attempts to reduce the production of FOD have been made such as with utilizing titanium in the construction of the threaded fastener in the interest of use of a hard material to resist generation of filings. However, threaded fasteners constructed of titanium still incur cut threads in the securement process of the threaded fastener to the e-nut and generate FOD. As a result, it would be beneficial to have a threaded fastener that would not generate FOD with securing the threaded fastener to an e-nut.

SUMMARY

An example includes a fastener, which includes a first portion of a shaft which defines threads, and a second portion of the shaft, which extends from the first portion of the shaft, includes a planar curved surface.

An example includes a method for securing a fastener to an e-nut, which includes a step of inserting the fastener positioned within an e-nut into an opening defined by and which extends through at least two components to be secured together, wherein: a first portion of the shaft of the fastener defines threads; and a second portion of the shaft of the fastener, which extends from the first portion of the shaft, defines a curved planar surface.

The features, functions, and advantages that have been discussed can be achieved independently in various embodiments or may be combined in yet other embodiments further details of which can be seen with reference to the following description and drawings.

DESCRIPTION

Figure 1:
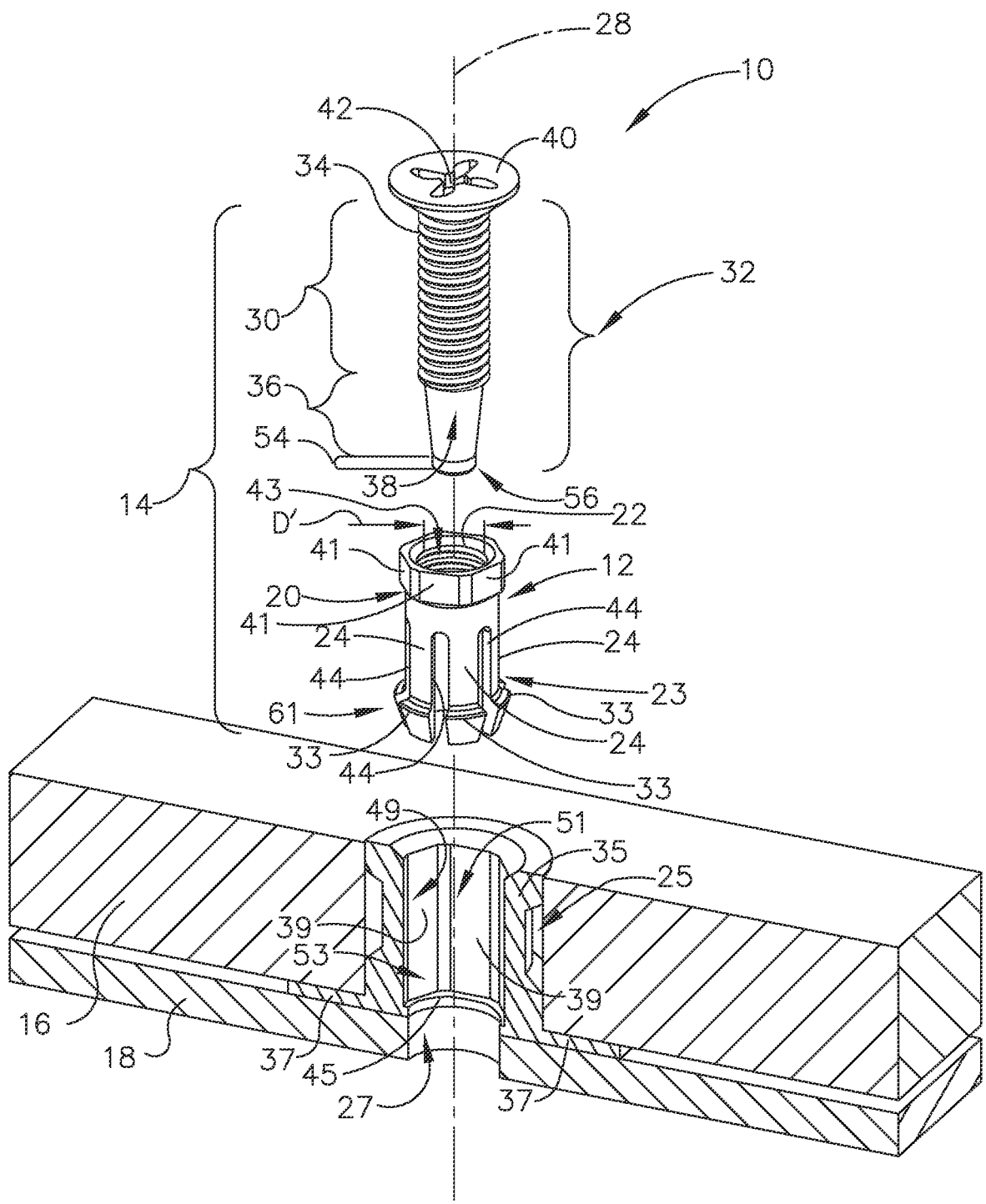
FIG. 1 is exploded perspective view of the fastener and the e-nut used for fastening together an assembly of two components which are shown in cross section.
Figure 4:
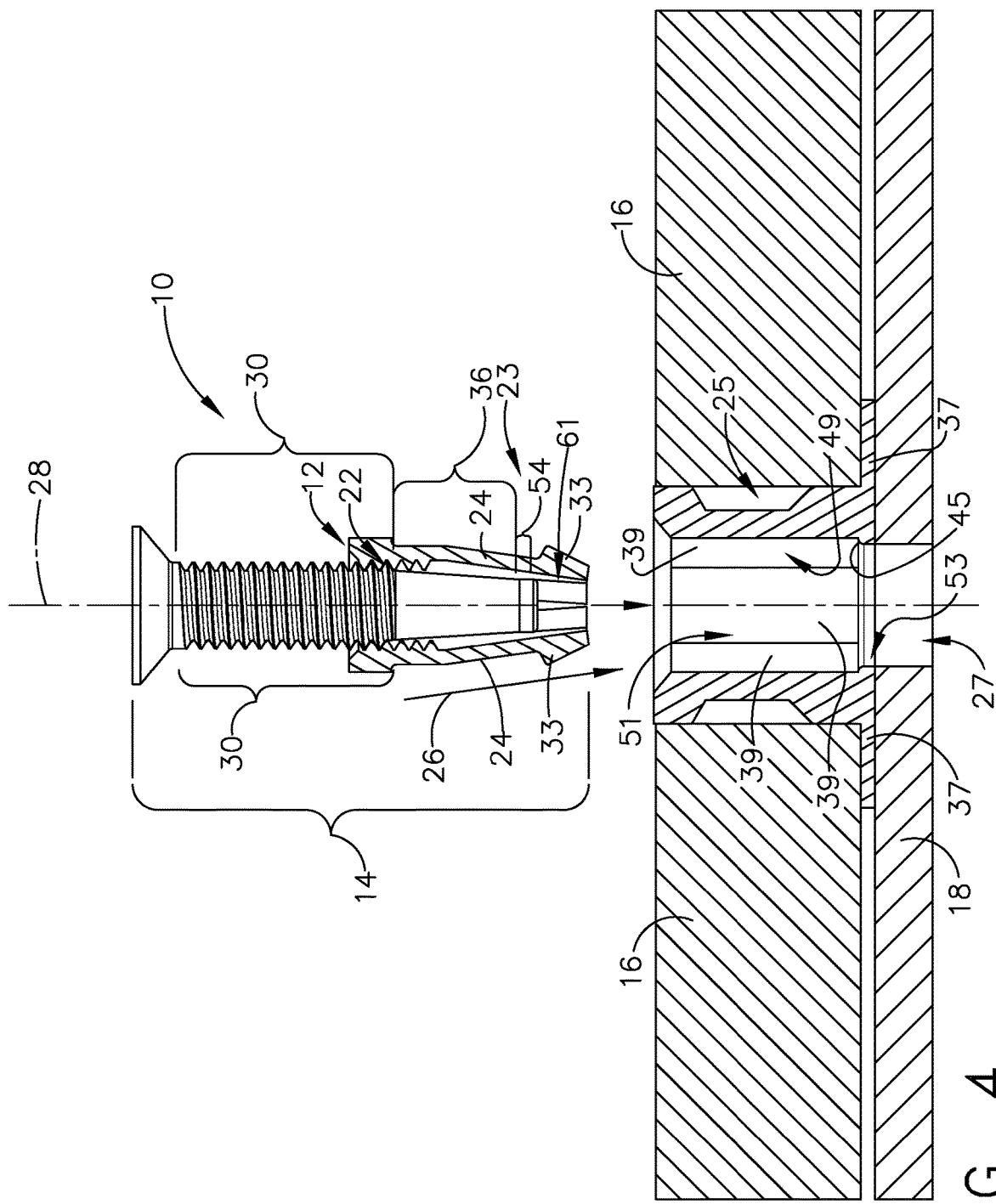
FIG. 4 is a side elevation view in partial cross section of the fastener and the e-nut of FIG. 1, with the fastener positioned within the e-nut and positioned outside a hole extending through the assembly of the two components to be secured together, wherein the e-nut and the assembly of the two components are shown in cross section.
Figure 5:
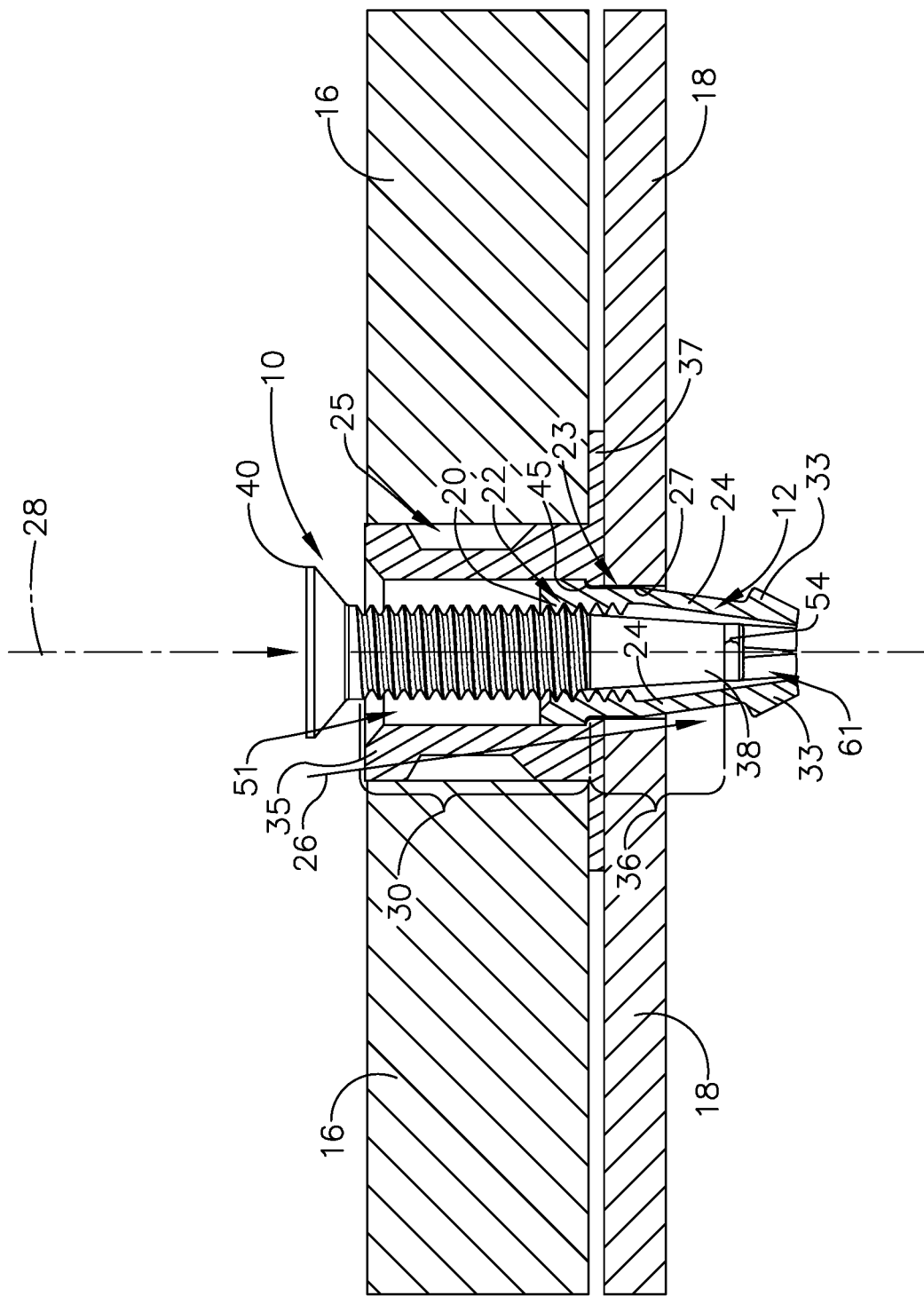
FIG. 5 is a side elevation view of the fastener and e-nut of FIG. 4 inserted within the hole with at least a portion of the e-nut and a securement flange of a tine of the e-nut positioned beyond the two components to be secured together.
Figure 6:
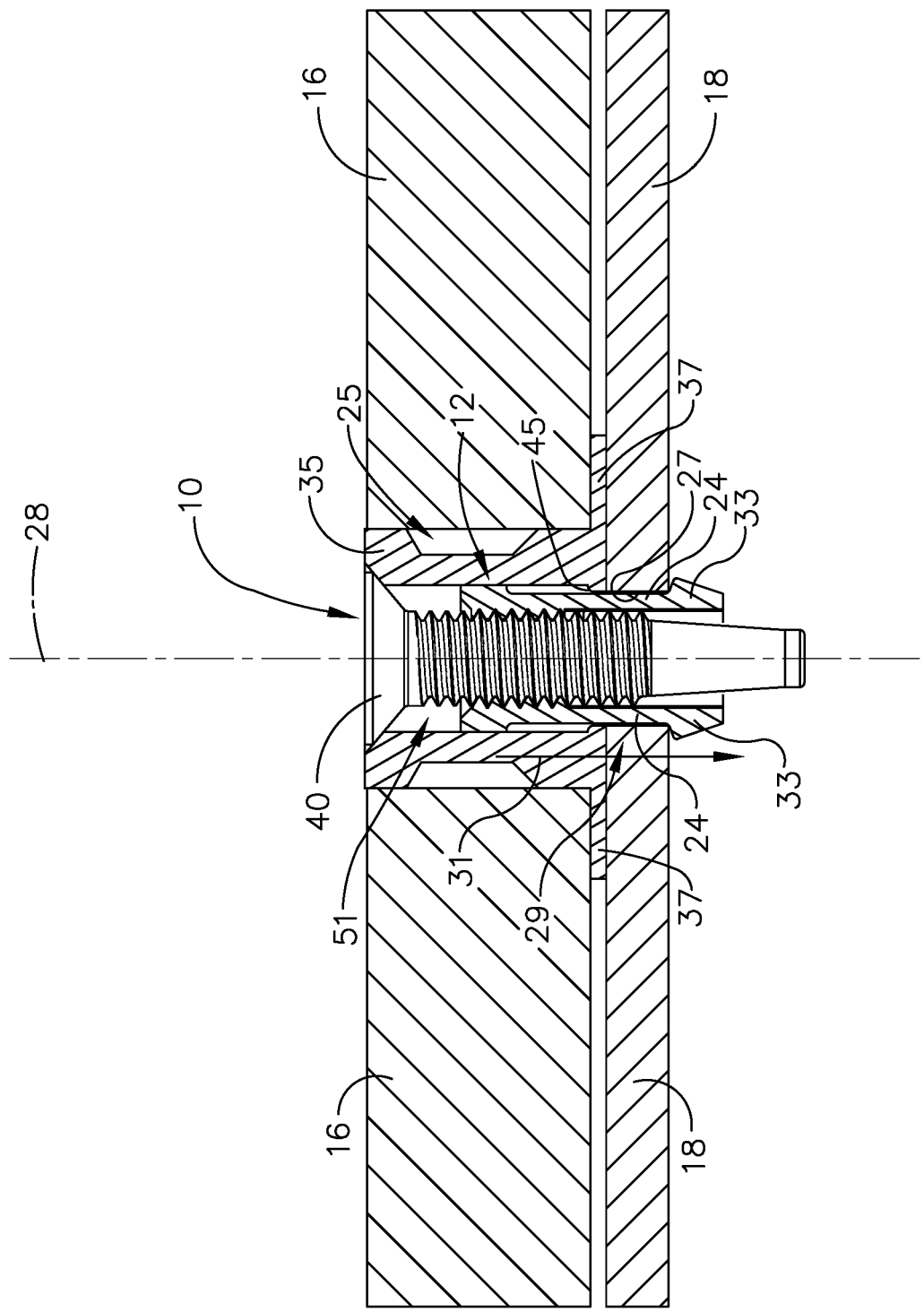
FIG. 6 is a side elevation the view of FIG. 5 of the fastener having been rotated and advanced through the e-nut moving at least one tine having the securement flange of the e-nut in a direction away from the central axis of the fastener and securing the two components together.

In referring to FIG. 1, fastener 10 is shown which secures to e-nut 12 providing fastener assembly 14 for securing two or more components together, such as in this example, floor panel 16 and seat track 18 in fabrication of an aircraft. E-nut 12 includes body 20 which defines threads 22 and at least one tine 24 which extends away from threads 22 and in a collapsed position 23, as seen in FIGS. 1, 4 and 5. In this example, six tines 24 are defined by e-nut 12 wherein each tine 24 extends in an angular direction 26 relative to and toward central axis 28 of fastener 10. Collapsed position 23 of at least one tine 24, and in this example, all of tines 24, is seen in FIGS. 4 and 5 with fastener 10 positioned within e-nut 12. Tines 24 maintain collapsed position 23 and until moved into a final securement position 29, as seen in FIG. 6, wherein tines 24 and securement flange 33 of tines 24 have been moved away from central axis 28 of fastener 10 and fastener 10 moves through e-nut 12 with fastener 10 being tightened. With fastener 10 being tightened securement flange 33 is positioned into abutting relationship with seat track 18 and a compressive force is exerted on floor panel 16 and seat track 18 between head 40 of fastener 10 and securement flange 33 providing securement of at least two components such as floor panel 16 and seat track 18.

Collapsed position 23 of tines 24 facilitate e-nut 12 being moved through opening 25, which has been drilled or reamed through floor panel 16 and being moved through opening 27 which has similarly been drilled or reamed through seat track 18. Opening 25 and opening 27 are positioned in alignment one another. Tines 24 in collapsed position 23 are initially moved through openings 25 and 27 of the at least two components, floor panel 16 and seat track 18, as seen in FIG. 5 positioning securement flanges 33 of tines 24 outside of opening 27 of seat track 18, in this example.

In FIG. 6, tines 24 have been moved by fastener 10 in a direction away from central axis 28 of fastener 10 where tines 24, in this example, are now aligned in direction 31 with body 20 of e-nut 12. With tines 24 aligned in direction 31, securement flanges 33 are positioned in alignment with seat track 18 positioned about and adjacent to opening 27. Final securement position 29 is attained with tightening of fastener 10 such that a compressive force is applied to floor panel 16 and seat track 18 between head 40 of fastener 10 and securement flanges 33 of tines 24 of e-nut 12, as seen in FIG. 6.

Fastener 10 includes first portion 30 of shaft 32 which defines threads 34 and second portion 36 of shaft 32, which extends from first portion 30 of shaft 32. Second portion 36 of shaft 32 includes planar curved surface 38. First portion 30 of shaft 32 is connected to head 40. Head 40 defines opening 42 for receiving an insertion of a tool, such as a screw driver or power screw driver, for securing fastener 10 to e-nut 12. Fastener 10 is constructed of a hard material such as for example titanium or steel, for example, with threads 34 of first portion 30 of shaft 32 being compatible in configuration with threads 22 defined by e-nut 12.

Figure 2:
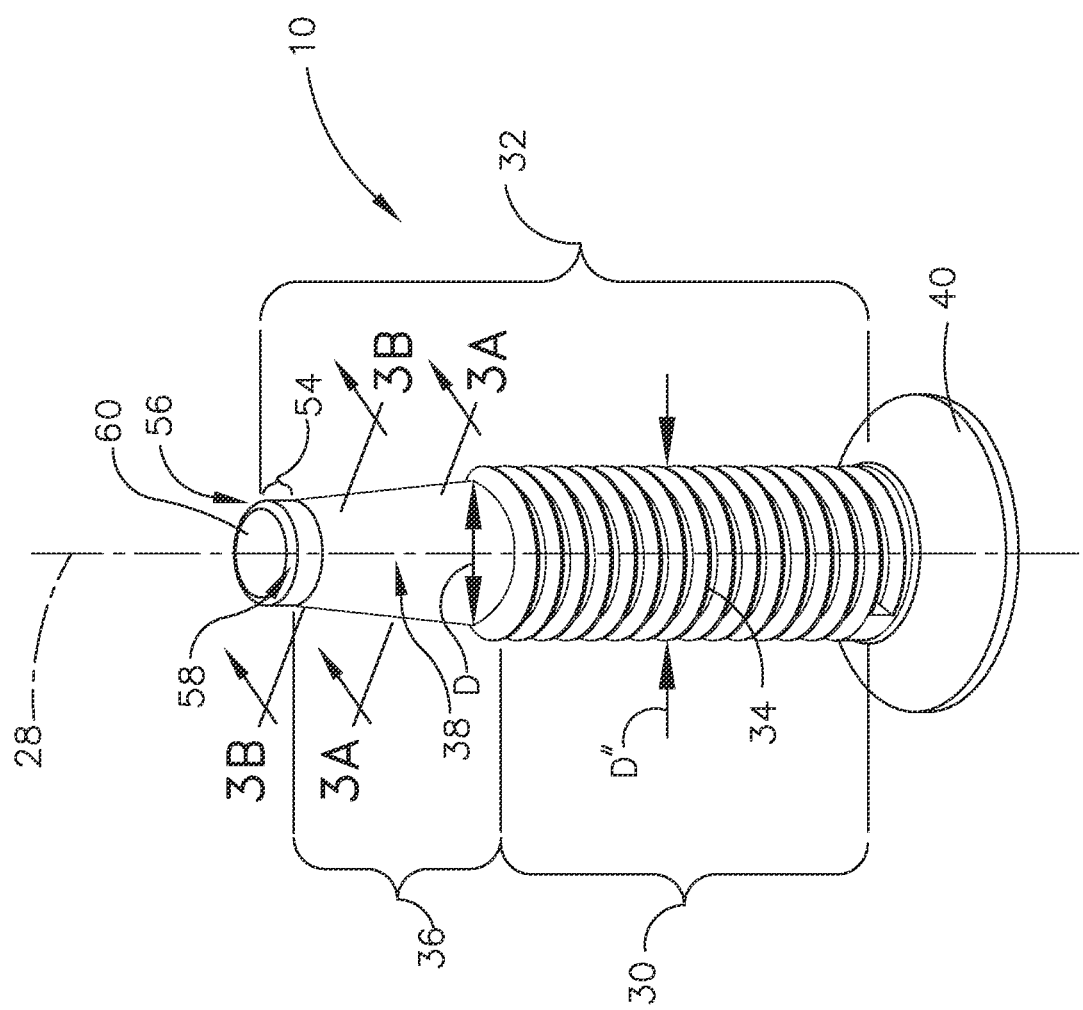
FIG. 2 is a bottom perspective view of the fastener of FIG. 1.

Diameter D of second portion 36 of shaft 32 of FIG. 2 has a dimension less than a diameter D' defined by threads 22, which are defined by an e-nut 12, as seen in FIG. 1, which is to be secured to shaft 32 of fastener 10. Diameter D which permits clearance for second portion 36 to pass through and beyond threads 22 within e-nut 12 with inserting fastener 10 into e-nut 12. With second portion 36 able to pass through threads 22 of e-nut 12, threads 34, of first portion 30 of shaft 32 of fastener 10, which define diameter D", as seen in FIG. 2, and are compatible with threads 22 of e-nut 12, are able to engage threads 22 of e-nut 12, as seen in FIGS. 4-5.

With inserting fastener 10 into e-nut 12 as seen in FIG. 4, a couple of threads 34, as seen in this example, engage a couple of threads 22 of e-nut 12, fastener assembly 14 is inserted into openings 25 and 27 of floor panel 16 and seat track 18 respectively, and in this example is inserted into insert 35 positioned within opening 25 and then through opening 27 of seat track 18. In this example, insert 35 is positioned within opening 25 of floor panel 16 wherein insert 35 includes flange 37, which extends about insert 35 and is bonded to floor panel 16 as seen in FIG. 1, securing insert 35 to floor panel 16. Seat track 18 is then positioned, in this example, to be placed against floor panel 16 prior to securement with fastener assembly 14 with opening 27 in alignment with opening 51 defined by insert 35 positioned within opening 25.

Insert 35 includes internal wall surfaces 39 forming a hexagon shape for opening 51, as seen in FIGS. 1 and 4. Internal wall surfaces 39 of insert 35 are configured and dimensioned to receive hexagon shape of body 20 of e-nut 12 having wall surfaces 41, as seen in FIG. 1, which extend about and surround opening 43 of e-nut 12 and are configured to abut internal wall surfaces 39 of insert 35. Wall surfaces 41 when placed within opening 51 of insert 35 in abutting relationship with internal wall surfaces 39 of insert 35, e-nut 12 resists rotation being positioned within opening 51 of insert 35. In addition, insert 35 includes ledge 45 positioned extending from and about lower portion 53 of interior 49 of internal wall surfaces 39 of insert 35. Ledge 45 will engage body 20 of e-nut when fastener assembly 14 is initially inserted into insert 35, such that ledge 45 blocks e-nut 12 from being pushed too far through opening 27 of seat track 18. In other examples, of use of fastener assembly 14, securement of at least two components together is also accomplished without employment of insert 35.

Figure 3A:
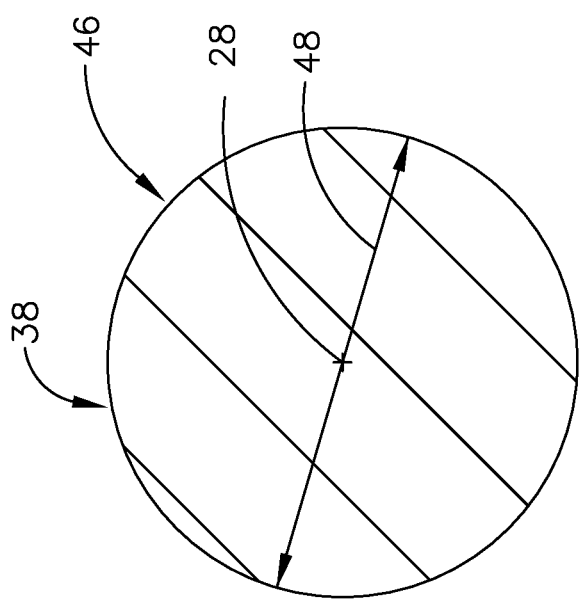
FIG. 3A is a cross section view of the fastener of FIG. 1 taken along line 3A-3A.
Figure 3B:
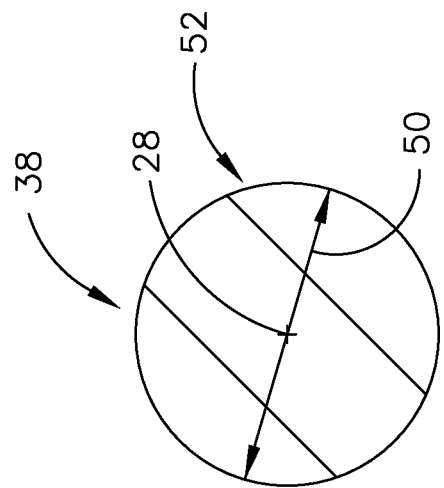
FIG. 3B is a cross section view of the fastener of FIG. 1 taken along line 3B-3B.

Second portion 36 of shaft 32 has a tapered configuration as seen in FIG. 2, which narrows as second portion 36 extends away from first portion 30. Second portion 36 of shaft 32 has circular cross section 46, as seen in FIGS. 2 and 3A, having diameter 48 greater in dimension than diameter 50 of second circular cross section 52, as seen in FIGS. 2 and 3B, of second portion 36, with diameter 50 of second circular cross section 52 being positioned further away from first portion 30 of shaft 32 than diameter 48 of circular cross section 46, as seen in FIG. 2. Second portion 36 of shaft 32, in this example, has a truncated conical shape. In this example, the tapered configuration of second portion 36 will be employed in pushing tines 24 of e-nut 12 in a direction away from central axis 28 of fastener 10 which will reduce force applied by tines 24 against threads 34 of first portion 30 as threads 34 encounter tines 24 in securing fastener assembly 14, as will be discussed herein.

Second portion 36 of fastener 10 further includes, in this example, third portion 54 of the shaft 32 extending from second portion 36 of shaft 32, as seen in FIG. 2. At least a portion of the third portion 54 of shaft 32 includes a cylindrical shape. A distal end portion 56 of third portion 54, from second portion 36, defines beveled surface 58 extending about third portion 54 and defines planar surface 60 which extends transverse to central axis 28 of shaft 32. The configuration and dimension of third portion 54 provides for fastener 10 to be initially positioned within an end portion 61 of collapsed tines 24 of e-nut 12, beyond the position shown in FIGS. 4 and 5, such that third portion 54 will not prematurely push against tines 24 and move them away from central axis 28 during the initial insertion of the fastener assembly 14 into, in this example, insert 35.

In referring to FIG. 5, fastener assembly 14 has been inserted, in this example, into insert 35 such that body 20 of e-nut 12 abuts ledge 45. With rotating fastener 10, threads 34 of first portion 30 of shaft 32 advance along threads 22 of e-nut 12 resulting in second portion 36 of shaft 32 contacting at least one tine 24 of e-nut 12. In this example, planar curved surface 38 contacts all tines 24 of e-nut 12 at an end portion 61 of tines 24. Further rotation of fastener 10 results in planar curved surface 38 pushing at least one tine 24, in this example, all of tines 24 in a direction away from central axis 28 of the fastener 10. Securement flanges 33 of tines 24 are moved such that securement flanges 33 extend beyond opening 27 of seat track 18. As head 40 reaches contact with insert 35, continued rotation of fastener 10 draws e-nut 12 toward head 40 of fastener 10 until securement flanges 33 abut seat track 18 as seen in FIG. 6 and a tightened torque is attained providing a compressive force of securement on floor panel 16 and seat track 18 between head 40 and securement flanges 33. With planar curved surface 38 making initial contact with tines 24, commence pushing tines 24 away from central axis 28 and as threads 34 of first portion 30 of fastener 10 advance from threads 22 of e-nut 12, threads 34 encounter tines 24 that are already being moved in a direction away from central axis 28 of fastener 10 by planar curved surface 38 and as a result encounter less force being exerted onto threads 34 as fastener assembly 14 is secured in contrast to a force encountered by threads of a threaded cylindrically shaped bolt being employed as a fastener to push tines 24 from a collapsed position. With less force being exerted on threads 34 by tines 24 with planar curved surface 38 employed in pushing tines 24, production of FOD is reduced or eliminated by way of sharp edges 44 of tines 24.

Figure 7:
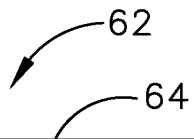
FIG. 7 is a flow chart of a method for securing a fastener to an e-nut.

In referring to FIG. 7, method 62 for securing fastener 10 to e-nut 12, includes step 64 of inserting fastener 10 positioned within e-nut 12 into opening, in this example includes opening 25 and 27 defined by and which extends through at least two components, such as in this example, floor panel 16 and seat track 18 to be secured together. First portion 30 of shaft 32 of fastener 10 defines threads 34 and second portion 36 of shaft 32 of fastener 10, which extends from first portion 30 of shaft 32, defines planar curved surface 38. Step 64 of inserting includes at least a portion of the threads 34 of first portion 30 of shaft 32 engage at least a portion of threads 22 defined by e-nut 12. As discussed in the current example, a couple of threads 34 initially engage a couple of threads 22. Step 64 of inserting fastener 10 positioned within e-nut 12 further includes pushing securement flange 33 of tine 24 of e-nut 12 beyond opening, which in this example includes openings 25 and 27, as seen in FIG. 5.

Method 62 further includes rotating fastener 10 such that planar curved surface 38 of second portion 36 of shaft 32 of fastener 10 contacts, pushes against and moves beyond at least one tine 24 moving at least one tine 24 having securement flange 33 in a direction away from central axis 28 of fastener 10. Further rotating of fastener 10 imparts a compressive force on at least two components, in this example, being floor panel 16 and seat track 18, being secured together between head 40 connected to first portion 30 of fastener 10 and securement flange 33 of at least one tine 24 abutting one of the two components, which in this example one component is seat track 18. With sufficient torque applied to fastener 10, the at least two components are secured together and with planar curved surface 38 of second portion 36 of shaft 32 of fastener 10 pushing tines 24 in a direction away from central axis 28, threads 34 of first portion 30 of fastener 10 encounter less force being exerted on threads 34 as threads 34 pass by tines 24 resulting a reduction or elimination of FOD being generated by sharp edges 44 of tines 24.

What is claimed:

1. A fastener assembly, comprising:
   a fastener including a head and a shaft extending from the head;
   wherein the shaft includes a first portion that presents threads, a second portion that extends from the first portion and tapers inwardly as the second portion extends away from the first portion, and a third portion that extends away from the first portion and the second portion, and wherein the second portion is disposed between the first portion and the third portion;
   an e-nut including an inner wall that defines a boundary of a hole, wherein the inner wall of the e-nut presents threads, and the e-nut includes at least one tine;
   wherein the threads of the first portion of the shaft and the threads of the e-nut engage each other to attach the fastener and the e-nut together as a sub-assembly in an initial position;
   an insert defining an opening extending between a first end and a second end of the insert, and the opening of the insert is configured to receive the sub-assembly in the initial position, wherein the insert includes an internal wall surrounding the opening to define a boundary of the opening, and the insert includes a ledge extending outwardly from the internal wall into the opening of the insert, and a portion of the e-nut abuts the ledge when the sub-assembly is disposed inside of the opening in the initial position; and
   wherein the sub-assembly is movable from the initial position to a final position within the insert to attach the sub-assembly to the insert by rotating the fastener relative to the e-nut in which the threads of the first portion of the shaft advance along the threads of the e-nut such that the shaft engages the inner wall of the e-nut which pushes the at least one tine outwardly away from the shaft to the final position.

2. The fastener assembly of claim 1, wherein the first portion of the shaft of the fastener is connected to the head.

3. The fastener assembly of claim 2, wherein the head defines an opening for receiving an insertion of a tool.

4. The fastener assembly of claim 1, wherein a diameter of the second portion of the shaft of the fastener has a dimension less than a diameter defined by the threads of the e-nut.

5. The fastener of claim 1, wherein the second portion of the shaft of the fastener has a circular cross section positioned abutting the first portion of the shaft and a circular cross section abutting the third portion of the shaft.

6. The fastener of claim 5, wherein a diameter of the circular cross section of the second portion is greater in dimension than a dimension of a diameter of a second circular cross section positioned farther away from the first portion of the shaft than the circular cross section.

7. The fastener assembly of claim 1, wherein the third portion of the shaft of the fastener comprises a distal end portion which comprises a beveled portion extending about the third portion.

8. The fastener assembly of claim 7, wherein a distal end of the third portion of the shaft of the fastener comprises a planar surface.

9. The fastener assembly of claim 1, wherein a distal end portion of the third portion of the shaft of the fastener from the second portion defines a beveled surface extending about the third portion of the shaft.

10. The fastener assembly of claim 9, wherein the distal end portion of the third portion of the shaft of the fastener defines a planar surface which extends transverse to a central axis of the shaft.

11. The fastener assembly of claim 1, wherein the at least one tine is further defined as a plurality of tines, and wherein with rotation of the threads of the first portion of the shaft relative to the threads of the e-nut results in a planar curved surface of the second portion of the shaft contacting each of the tines of the e-nut at an end portion of the tines.

12. The fastener assembly of claim 11, wherein the planar curved surface of a truncated conical shape of the second portion of the shaft contacts each of the tines and pushes each of the tines away of the e-nut away from a central axis of the fastener.

13. The fastener assembly of claim 12, wherein each of the tines include a securement flange.

14. The fastener assembly of claim 13, wherein each of the tines are positioned about the central axis of the fastener with the fastener positioned within the e-nut.

15. A method for securing a fastener assembly to two or more components, comprising the step of:
inserting the fastener assembly into an opening of an insert in an initial position until a portion of an e-nut abuts a ledge of the insert, wherein the opening of the insert extends between a first end and a second end of the insert, and the insert includes an internal wall surrounding the opening to define a boundary of the opening, and the ledge extends outwardly from the internal wall into the opening of the insert, wherein the insert is disposed in an opening of at least one of the two or more components, and wherein the fastener assembly includes a fastener and the e-nut attached to each other as a sub-assembly, wherein:
the fastener includes a head and a shaft extending from the head, wherein the shaft includes a first portion that presents threads, a second portion that extends from the first portion and tapers inwardly as the second portion extends away from the first portion, and a third portion that extends away from the first portion and the second portion, and wherein the second portion is disposed between the first portion and the third portion;
the e-nut includes an inner wall that defines a boundary of a hole, wherein the inner wall of the e-nut presents threads, and the e-nut includes at least one tine; and
the threads of the first portion of the shaft and the threads of the e-nut engage each other to attach the fastener and the e-nut together as the sub-assembly in the initial position; and
moving the sub-assembly from the initial position to a final position within the insert to attach the sub-assembly to the two or more components by rotating the fastener relative to the e-nut in which the threads of the first portion of the shaft advance along the threads of the e-nut such that the shaft engages the inner wall of the e-nut which pushes the at least one tine outwardly away from the shaft and into engagement with at least one of the two or more components to the final position.

16. The method of claim 15, wherein the step of inserting the fastener assembly includes the second portion of the shaft pushes the at least one tine in a direction away from a central axis of the fastener.

17. The method of claim 15, wherein the at least one tine includes a securement flange, and wherein moving the sub-assembly from the initial position to the final position further includes moving the e-nut relative to the opening of the insert during rotation of the fastener to the final position which disengages the portion of the e-nut from the ledge and moves the securement flange into engagement with at least one of the two or more components.

18. The method of claim 17, wherein the at least one tine is further defined as a plurality of tines, and wherein the step of inserting the fastener assembly further including a planar curved surface of the second portion of the shaft of the fastener, contacts, pushes against and moves each of the tines of the at least one tine in a direction away from a central axis of the fastener.

19. The method of claim 18, wherein the step of inserting the fastener assembly further includes rotating the fastener and imparting a compressive force on the two or more components being secured together between the head connected to the first portion of the fastener and the securement flange of the at least one tine of the e-nut.

20. The method of claim 18, wherein each of the tines are positioned about the central axis of the fastener, with the fastener positioned within the e-nut, and each tine of the tines includes the securement flange.

21. A fastener assembly, comprising:
a fastener, comprising:
a head;
a first portion of a shaft which extends from the head and the first portion of the shaft defines threads;
a second portion of the shaft extends from the first portion of the shaft, wherein:
the second portion of the shaft has a truncated conical shape, which tapers as the second portion extends from the threads of the first portion of the shaft and extends towards a third portion of the shaft; and
the third portion of the shaft extends from the second portion of the shaft, wherein at least a portion of the third portion of the shaft comprises a cylindrical configuration; and
an e-nut, comprising threads, wherein:
the threads of the first portion of the shaft are compatible for engagement with the threads of the e-nut;
with the threads of the e-nut and the threads of the first portion of the shaft of the fastener engaged and with rotation of the first portion of the shaft relative to the shaft of the fastener engaged and with rotation of the first portion of the shaft relative to the e-nut, the threads of the first portion of the shaft advance along the threads of the e-nut such that a planar curved surface of the truncated conical shape of the second portion of the shaft contacts at least one tine of the e-nut and pushes the at least one tine and with continued rotation of the first portion of the shaft, the e-nut moves on the threads of the first portion of the shaft toward the head of the fastener; and
the e-nut has multiple wall surfaces connected together, wherein:
the multiple wall surfaces extend about and surround an opening of the e-nut; and
the multiple wall surfaces are configured to align with internal wall surfaces of an insert with the multiple wall surfaces of the e-nut positioned within the insert; and
wherein the insert defines an opening and the insert is positioned within an opening of a component to be secured to another component such that the opening of the insert is aligned with the opening of the component, wherein:
the insert defines a ledge; and the ledge aligns with a body of the e-nut such that the ledge abuts the body of the e-nut and prevents the e-nut from passing through and out of the insert.

\* \* \* \* \*